Sept. 5, 1933.  H. PENNINGTON  1,925,970
SPINNING TONG
Filed July 7, 1930   2 Sheets-Sheet 2
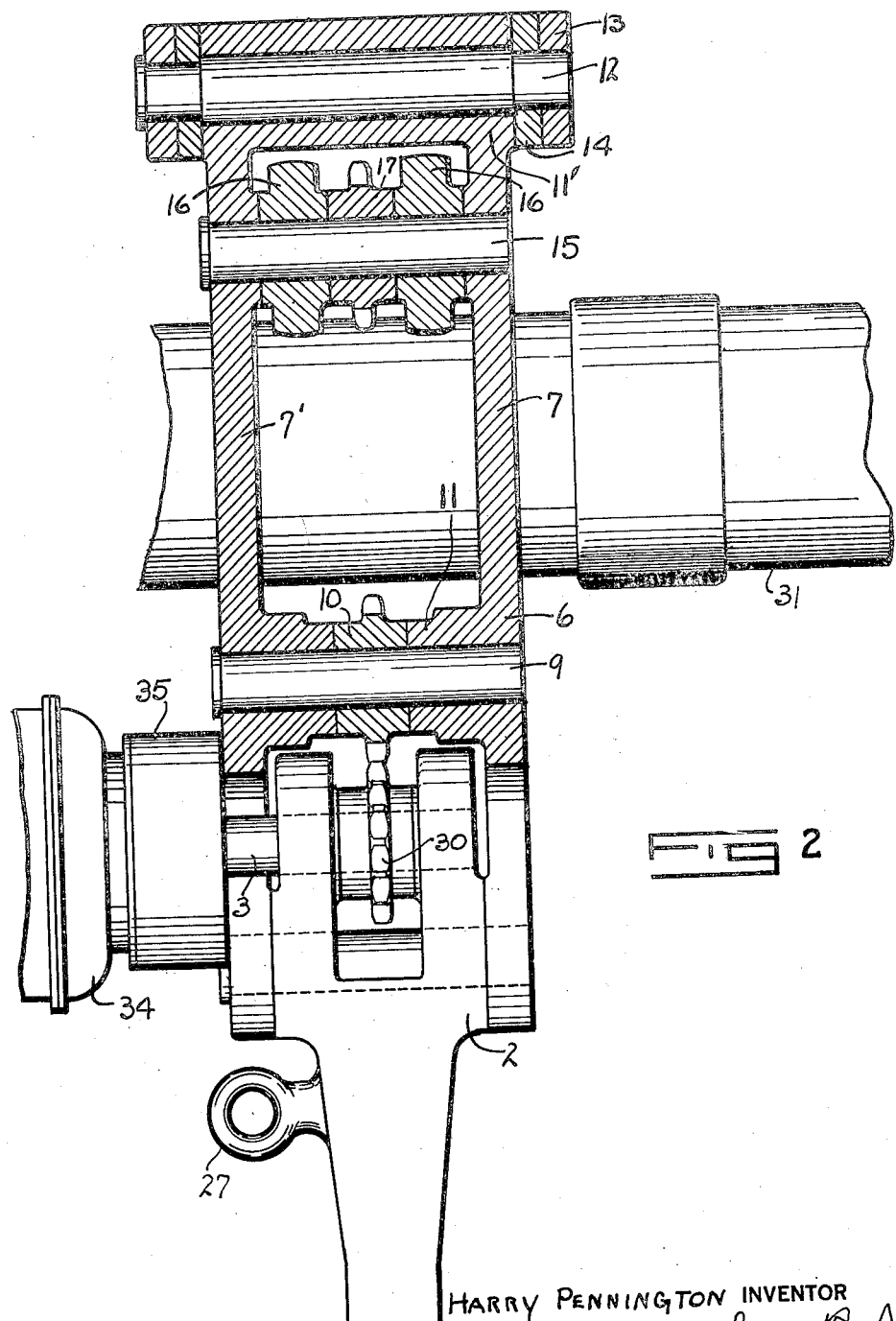
HARRY PENNINGTON INVENTOR
BY Jesse R. Stone
Lester B. Clark
ATTORNEYS Patented Sept. 5, 1933

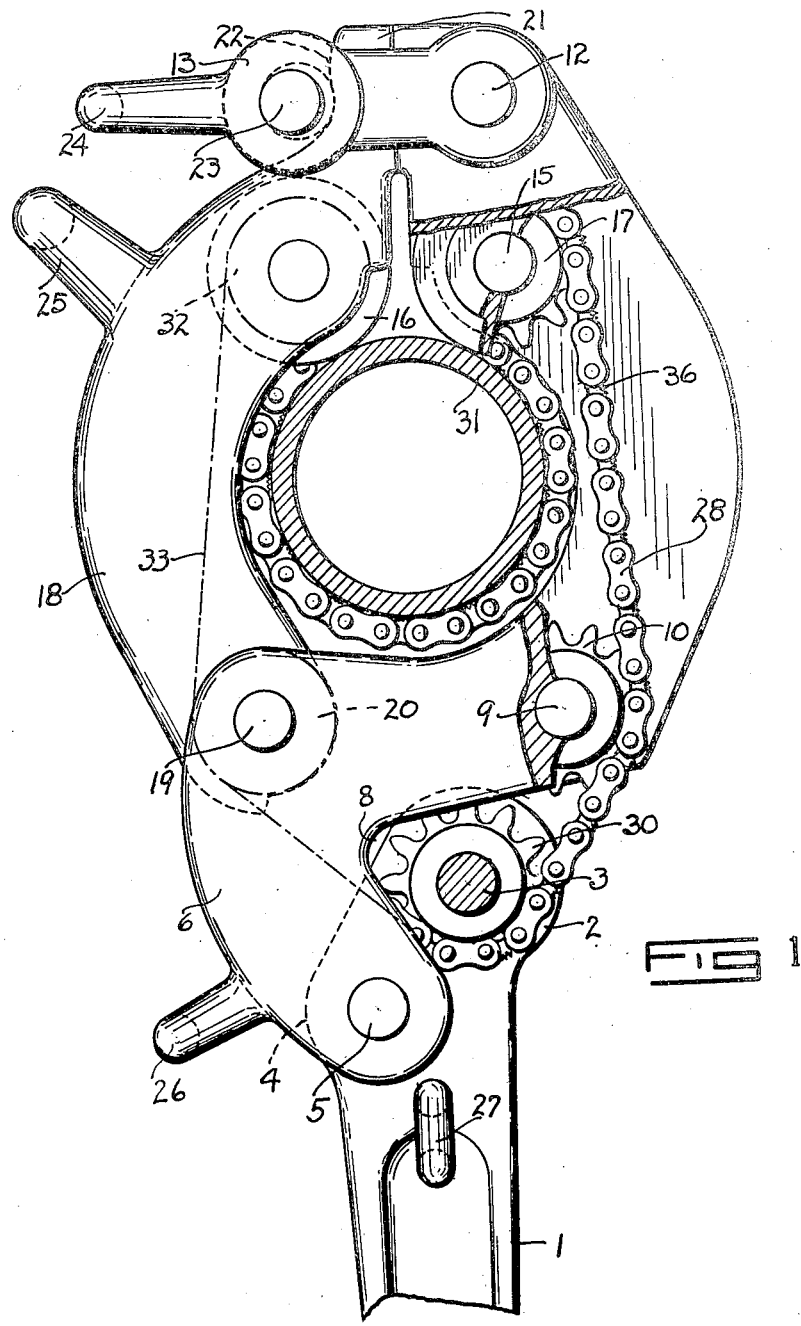

1,925,970

UNITED STATES PATENT OFFICE 1,925,970

SPINNING TONG

Harry Pennington, San Antonio, Tex.

Application July 7, 1930. Serial No. 465,923

16 Claims. (Cl. 81—57)

My invention relates to tongs for handling pipe in deep well operations.

In handling pipe in deep wells for oil, gas, sulphur, and the like, the drill stem or other pipe being introduced into or removed from the hole must be taken apart in section and, in connecting or disconnecting one section from the other, the joints must be screwed up or unscrewed as the case may be. As there are many joints to be thus manipulated it is desirable that the joints be made up or loosened at high speed, and furthermore it is desirable that the joints be made up until they are properly tightened but should not be strained beyond the point necessary for a seal at the joint.

It is an object of my invention to provide pipe tongs which may be employed to rotate the pipe in the screwing up or unscrewing of these joints so that the connection may be quickly made or broken.

It is also an object to provide a device whereby it is unnecessary to rotate the rotary mechanism connected with the drilling operation in order to make or break the connection.

I desire to provide a power-driven tong which is safe and speedy, and uniform in the torque applied to tighten pipe threads or tool joints.

In carrying out my invention I contemplate the use of means connected with the tong itself whereby the pipe may be rotated relative to the body of the tong without the necessity of using the engine employed upon the rotary.

Referring to the drawings herewith, Fig. 1 is a broken top view of a pipe tong embodying my invention, certain parts being broken away for greater clearness.

Fig. 2 is a side view taken at right angles to the view shown in Fig. 1, certain parts of the tong being broken away in section.

In the construction of my tong, I provide a handle 1, which may be of the desired length, said handle being broken off in the drawings. The forward end of the handle is provided with a rounded head 2, which furnishes a support for a power shaft 3 rotatable in said head. On the opposite side of the head the same is extended laterally as shown in dotted lines at 4, and an opening is provided to receive a pivot pin 5, upon which the main jaw 6 is pivoted.

The main jaw 6 is made up of two side plates 7, 7', shown best in Fig. 2. These plates are spaced apart to receive the head 2 of the handle. The shaft 3 is mounted only in the handle, and a recess, shown at 8 in Fig. 1, provides for the movement of the shaft 3 with the head toward the jaw. Adjacent the inner end of the jaw 6 is a through bolt 9 which furnishes a shaft upon which is rotatably mounted a sprocket wheel 10. The sides of the jaws are extended inwardly at 11 to form bosses which fit against the sides of the sprocket wheel and hold it centered properly in position.

The outer ends of the plates may be joined integrally, as shown at 11', to receive a latching bolt 12, which extends transversely through the sides of the jaw. Said latching bolt extends beyond the sides of the jaw and pivotally supports a latching member 13, spaced from the jaw by a washer 14. Adjacent the outer end of the jaw is a shaft 15, fixed in position in the jaw and furnishing a bearing for two rollers 16 and a centrally positioned sprocket wheel 17. The two rollers are of approximately the same diameter as the sprocket wheel and have their peripheries slightly rounded to engage against the pipe and furnish a bearing for the tongs upon the pipe.

Another jaw 18 is mounted in a position opposed to the jaw 6. It is pivoted upon a pin or shaft 19 extending through the main jaw 6 at a position approximately opposite to that of the shaft 9 in the main jaw. Said pin furnishes a pivot for the jaw 18 and also furnishes a mounting for a sprocket wheel 20, which is positioned between the two sides of the jaw and is rotatable on the pin. The jew 18 is arcuate in shape and has its outer end 21 formed with a notch or recess 22 to receive the cam shaped pin within the latch member 13. Said latch comprises a yoke which may be swung around the end 21 of the jaw 18 and snapped into position in the recess 22 through means of the handle 24 of the said latch. The jaw 18 has a handle member 25, through which it may be swung to and from closed position. There is also a handle member 26 on the base of the jaw 6, through which a hold may be obtained upon the wrench in handling the same. There is also an outwardly extending staple or eyelet 27 in the handle adjacent the head thereof, through which the wrench as a whole may be suspended in the derrick.

The sprocket wheels previously mentioned have mounted thereon a sprocket chain 28, and, as will be seen from Fig. 1, said sprocket chain passes around the sprocket wheel 30, mounted upon the shaft 3. It passes from said wheel 30 around the wheel 10 to the wheel 17 and this is looped back to better surround the pipe shown at 31. From thence it passes around a sprocket wheel 32 in the outer end of the jaw 18 and is brought back around the sprocket wheel 20 to the starting point at the sprocket wheel 30. The dotted lines indicated at 33 shows the path of this chain.

The shaft 3 is arranged to be driven positively by a motor indicated at 34. Said motor is designated as an ordinary type of electric motor. It is to be understood, however, that any type of motor may be employed which may be desired and that I may employ as a motive power air, gas, or steam, as may be convenient.

The motor transmits motion through a reduction gear housed at 35 to the shaft 3 upon which the sprocket wheel 30 is fixed. Thus the rotation of the sprocket wheel will cause the operation of the chain upon the sprocket wheels in an obvious manner. The inner faces of the links in the chain 28 may be toothed, as shown at 36, to better engage the pipe so that when the chain is operated the pipe may be rotated. I contemplate arranging the tension upon the chain 28 so that it will cause the rotation of the pipe with a predetermined amount of force and when this force is exceeded the motor will stall and the chain will stop.

In the operation of my tongs it is to be understood that the tool will be suspended in the derrick as is the ordinary pipe tongs, having a counterbalance on the opposite end of the supporting cable or chain so that the tongs may be moved to a proper position upon the pipe with a minimum of difficulty. When the jaws are open the chain 28 will be stretched across the openings between the jaws. If the tong is then thrust against the pipe the chain 28 engaging the pipe will tend to draw the jaws together into the position shown in Fig. 1 and the latch member 13 will then be employed to latch the jaws together in operative position.

The motor may then be started to cause the running of the chain over the sprocket wheels, thus spinning the pipe and screwing or unscrewing the same as desired. If the joint is being made up the spinning of the pipe will be continued until the joint is tightened to the proper degree, after which the motor will be immediately stopped through the stalling of the same. By means of this tong I am enabled to screw up the joints in the pipe at an exceptional speed. The main engine operating the rotary may remain inactive. The tongs are simply clamped about the pipe and the motor 34 then employed to spin the tong to screw up the joint, after which the tongs may be quickly released and the draw works may be employed to shift the pipe into position for a second operation.

It is also to be noted that the chain may be tightened by the swinging of the handle to the left of its position in Fig. 1 and that the chain will be loosened by swinging said handle to the right. This is due to the off set position of the two jaw pivots. Thus the pipe joints may be readily regulated as to the degree of tightness to which they are screwed. When the handle is held stationary the tong will grip the pipe with a force proportional to the resistance of the pipe to rotation. That is, the gripping force developed is proportional to the power applied, which in turn is proportional to the resistance to rotation of the screw threads of the pipe.

My device is not only capable of easy and rapid operation but is economical in use and the ordinary heavy apparatus about the rotary need not be used.

What I claim as new is:

1. In a power driven pipe tong, a handle, a pair of jaws pivoted to swing about a pipe, sprocket wheels on said jaws, an endless chain engaged over said sprocket wheels and adapted to be brought into pipe-engaging position, said sprockets and the pivots of said jaws being so disposed that said chain will tighten about the pipe when said jaws are closed, means on one of said jaws engaging the end of the other to latch said jaws in closed position, and means to drive said chain relative to said jaws to rotate said pipe.

2. In a power driven pipe tong, a handle, a pair of jaws pivoted to swing about a pipe, sprocket wheels on said jaws, an endless chain engaged over said sprocket wheels, and adapted to be brought into pipe-engaging position, means to latch said jaws in closed position, a sprocket wheel on said handle engaging said chain, a motor adapted to rotate said last named sprocket wheel to drive said chain, said last sprocket wheel being movable with respect to said first sprockets to tighten and loosen said chain.

3. In a pipe tong an endless chain encircling and gripping the pipe, means to support the chain so that the outer side only of the said chain engages the pipe, means to drive the chain, and means to move at least a part of said support means to tighten the chain on the pipe in proportion to the resistance of the pipe to rotation.

4. In a pipe screwing tong, a pair of opening jaws, an endless chain carried by said jaws, and arranged with an inwardly directed loop to encircle the pipe without parting the chain, means to drive said chain, and means to tighten said chain in proportion to the resistance of the pipe to rotation including a sprocket movable relative to said jaws and the pipe which is engaged.

5. In a pipe screwing tong, an endless chain, means to engage said chain about a pipe, means to drive said chain to spin said pipe, and means to tighten said chain upon the pipe in proportion to the resistance of said pipe to rotation including a handle, a support for the chain thereon, said handle being movable with respect to said first means.

6. In a pipe tong, a tong body, jaws pivoted to open and close, an endless chain carried by said jaws and said body, sprockets for said chain, means to positively rotate one of said sprockets to move said chain through said rotation, and means carried by said body to tighten said chain through the movement of said rotated sprocket away from the pipe being gripped.

7. In a pipe tong, a handle, a head thereon, a sprocket on said head, a jaw pivoted to said head, a second jaw pivoted on said first jaw, sprockets on said jaws, an endless chain on said sprockets to engage the pipe and pull said jaws together, said handle being adapted to move said first sprocket away from the pipe to tighten said chain.

8. In a pipe screwing tong, a handle, a head thereon, a pair of jaws on said head pivoted to open and engage about the pipe, an endless chain held in position to encircle and grip the pipe between said jaws, support means on said head and jaws for said chain which are relatively movable to control the gripping of the chain, and means on said head for moving said chain to rotate the pipe.

9. In a pipe tong, a tong body, a pair of jaws pivoted to open and close, an endless chain carried by said jaws and said body, a plurality of sprockets for said chain, means to positively rotate one of said sprockets to move said chain, one of said sprockets being mounted on said body and movable away from the pipe upon increase of the torque required to rotate the pipe whereby said chain will more securely grip the pipe.

10. A spinning tong including a handle, a jaw pivoted thereto, a second jaw pivoted to said first jaw, an endless chain adapted to be held about the pipe by said jaws, a support for the chain on said handle, said support being eccentric with respect to the pivot point of said first jaw on said handle whereby turning of the handle to resist the torque of the pipe tends to move said support away from the pipe to tighten said chain about the pipe.

11. In a pipe spinning tong, a handle, an endless chain, a pair of jaws to encircle the pipe and hold said chain in frictional contact with the pipe to spin the same, a chain support adjacent the end of each jaw which has been passed about the pipe, and a drive sprocket for said chain mounted on said handle, and a pivotal mounting for one of said jaws positioned eccentrically of said handle with respect to said drive sprocket whereby said handle will move about said pivot in resisting the rotation of the pipe.

12. In a pipe spinning tong, an endless chain to spin the pipe, means to loop said chain about the pipe, a latch for said means, a drive means for said chain, and an eccentric mounting for said first means whereby said chain will be tightened by said drive means directly in proportion to the resistance to rotation of the pipe.

13. A spinning tong of the type wherein the grip on the pipe is increased according to the resistance to rotation of the pipe including a drive chain, jaws to support said chain looped about the pipe, and means to resist the torque on said chain from said pipe which tends to tighten the chain on the pipe.

14. A spinning tong of the type wherein the grip on the pipe is increased according to the resistance to rotation of the pipe including a drive chain, jaws to support said chain looped about the pipe, and means to resist the torque on said chain from said pipe which tends to tighten the chain on the pipe, said last means including a handle.

15. A tong of the character described including an endless chain to embrace the pipe to be rotated, means to loop said chain about the pipe so that it will have frictional contact with the pipe, means to exert a pull on said chain which will tend to reduce the size of the loop about the pipe, and a pivot connection between said first and said last means to absorb the reaction of the thrust of said last means.

16. A spinning tong including jaws to encircle the pipe, a handle, a pivot for said handle on one of said jaws, and about which the handle is adapted to move in resisting the torque of the pipe, an endless chain held about the pipe by said jaws, a drive sprocket for said chain mounted on said handle at a point other than said pivot whereby movement of the handle to resist torque tends to move said sprocket away from the pipe and tighten said chain.

HARRY PENNINGTON.